US006431214B1

(12) United States Patent
Herhold et al.

(10) Patent No.: US 6,431,214 B1
(45) Date of Patent: Aug. 13, 2002

(54) REMOVABLE VALVE ASSEMBLY

(75) Inventors: Matthew O. Herhold, Fenton; Daniel D. Trunick, Wixom, both of MI (US)

(73) Assignee: NLB Corp., Wixom, MI (US)

( * ) Notice: Subject to any disclaimer, the term of this patent is extended or adjusted under 35 U.S.C. 154(b) by 0 days.

(21) Appl. No.: 09/789,060

(22) Filed: Feb. 20, 2001

(51) Int. Cl.[7] ................................................ F16K 31/44

(52) U.S. Cl. ..................... 137/882; 239/124; 137/454.6

(58) Field of Search ................................ 137/877, 882, 137/454.6; 239/124

(56) References Cited

U.S. PATENT DOCUMENTS 5,165,451 A * 11/1992 Goldsmith .................. 137/882
5,253,808 A * 10/1993 Pacht ......................... 239/124
5,349,982 A * 9/1994 Goldsmith ............... 137/454.5
5,975,429 A * 11/1999 Jezek ......................... 239/124

* cited by examiner

*Primary Examiner*—John Fox
(74) *Attorney, Agent, or Firm*—Carlson Gaskey & Olds

(57) ABSTRACT

A valve assembly for use with a high pressure fluid gun includes a valve seat connected to a valve sleeve by a spring. The valve seat and the valve sleeve are crimped around opposing ends of the spring. A valve pin is secured to the valve sleeve, the spring allowing for the movement of the valve pin when a trigger mechanism is actuated. When installed, the valve pin is received and guided by a bore in the body of the fluid gun. When the valve pin is actuated by a trigger mechanism, a seat end of the valve pin sealingly engages an angled seat of the valve seat to direct the flow of fluid through a high pressure outlet.

12 Claims, 3 Drawing Sheets

REMOVABLE VALVE ASSEMBLY

BACKGROUND OF THE INVENTION

The present invention relates generally to a removable valve assembly for use with a high pressure fluid gun.

A high pressure fluid gun is utilized for surface cleaning. Fluid enters the gun from a fluid source through an input tube and exits at low pressure through a dump tube. When a trigger is actuated, a removable valve assembly directs the fluid through a high pressure outlet for cleaning.

In prior high pressure fluid guns, the valve assembly includes a valve pin having a seat end and a valve seat having a seating portion and a cylindrical valve guide. The valve pin is housed within the valve guide of the valve seat. When the trigger is actuated, the valve pin slides within the valve guide towards the seating portion until the seat end of the valve pin sealingly engages the seating portion of the valve seat. This directs the fluid through the high pressure outlet. In prior valve assemblies, the cylindrical walls of the valve seat guide the valve pin. The valve assembly is removable, allowing replacement as the valve assembly wears.

Because the valve seat includes walls to guide the valve pin, more material and expense is required. Therefore, it is desirable to utilize a valve assembly which does not include a valve seat having a cylindrical valve guide to guide a valve pin.

Hence, there is a need in the art for an improved removable valve assembly for use with a high pressure fluid gun.

SUMMARY OF THE INVENTION

The present invention relates generally to a removable valve assembly for use with a high pressure fluid gun.

The valve assembly of the present invention is installed within the body of a high pressure fluid gun. The valve assembly includes a valve seat and a valve sleeve connected by a spring. The valve seat and the valve sleeve include lips which are crimped around opposing ends of the spring to form the valve assembly. A valve pin is secured to the valve sleeve by an annular retainer clip. The spring allows for the movement of the valve pin within the body when the valve pin is actuated by a trigger mechanism. The valve pin is received and guided by a bore within the body of the fluid gun.

The valve pin includes a seat end which sealingly engages an angled seat of the valve seat when the valve pin is actuated by the trigger mechanism. In the preferred embodiment, the angled seat is angled at 65° and the seat end of the valve pin is angled at 60°, to provide for line contact between the seat end of the valve pin and the angled seat.

Seals are located on the valve seat and on the valve pin to prevent fluid from leaking from the valve assembly. A tab on the valve seat removably engages a groove in a retaining nut. The retaining nut is threaded into the body of the fluid gun to install the valve assembly.

Accordingly, the present invention provides a removable valve assembly for use with a high pressure fluid gun.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
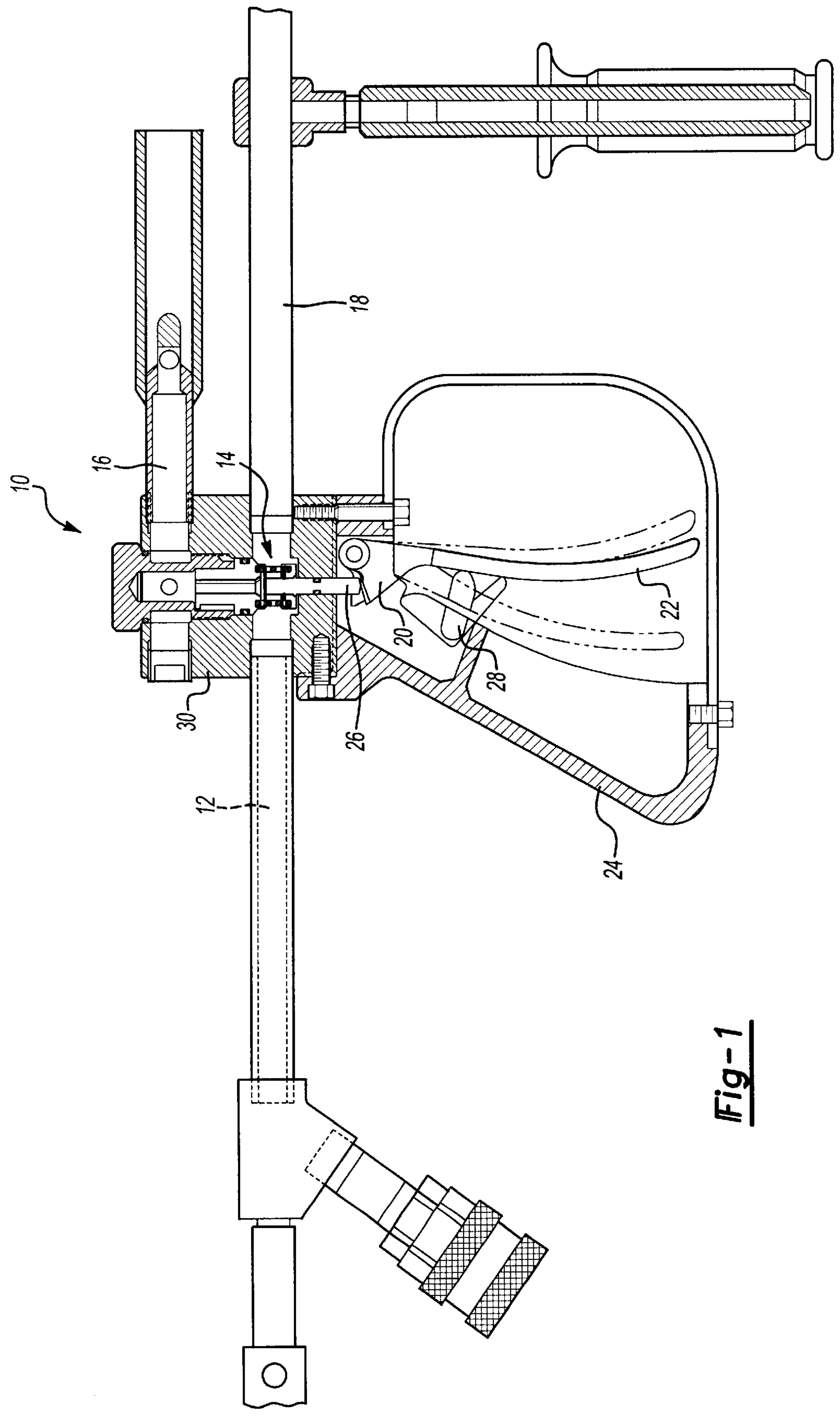
FIG. 1 illustrates a side view of a high pressure fluid gun.

FIG. 1 illustrates a high pressure fluid gun 10. The fluid gun 10 is utilized to control the flow of a high-pressure fluid. The fluid enters the high pressure fluid gun 10 through an input tube 12. A valve assembly 14 controls the flow of fluid exiting the fluid gun 10 by switching the flow between a dump tube 16 and a high pressure outlet tube 18. The dump tube 16 directs the incoming high pressure fluid to a low pressure outlet. The high pressure outlet tube 18 directs the incoming high pressure fluid out of the fluid gun 10 at high pressure onto a surface to be cleaned.

The valve assembly 14 is actuated by a trigger mechanism 20. When the trigger mechanism 20 is not actuated, the valve assembly 14 directs the incoming high pressure fluid into the dump tube 16 at low pressure. When a lever 22 is pulled back towards a handle 24, the trigger mechanism 20 engages a valve pin 26 of the valve assembly 14, directing the high pressure fluid through the high pressure outlet tube 18. When the lever 22 is released, a spring actuated member 28 biases the lever 22 back to the original position, disengaging the trigger mechanism 20 from the valve pin 26 and returning the valve pin 26 to the non-actuated position to direct the high pressure fluid through the dump tube 16 at low pressure.

Figure 2:
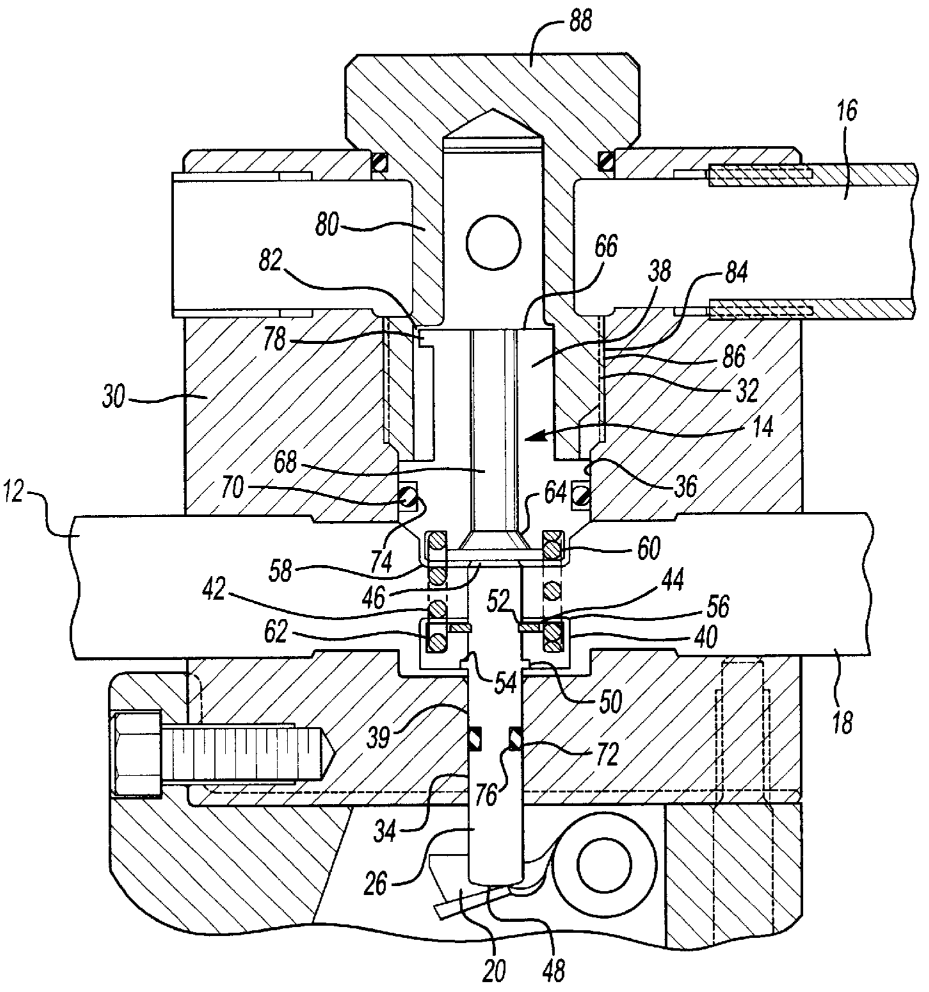
FIG. 2 illustrates an enlarged view of the gun body illustrated in FIG. 1.

As illustrated in FIG. 2, the valve assembly 14 of the present invention is positioned within a body 30 of the fluid gun 10. The body 30 includes an opening 32 and a bore 34. When the valve assembly 14 is installed within the body 30, the bore 34 substantially receives and guides the valve pin 26.

Figure 3:
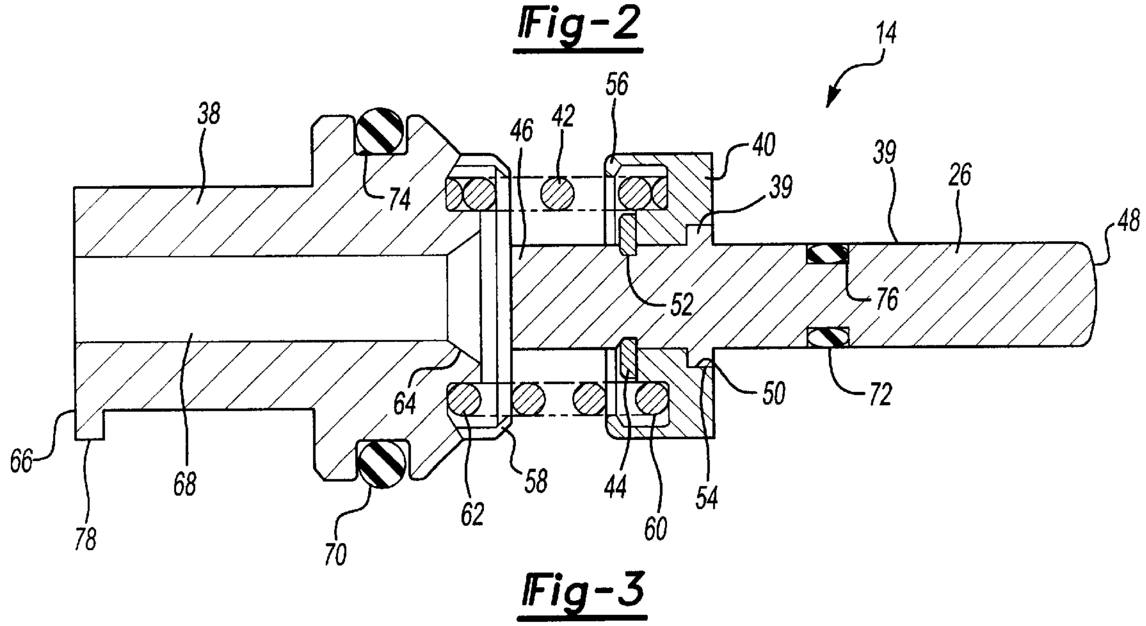
FIG. 3 illustrates a cross-sectional side view of the removable valve assembly of the present invention in the open position.
Figure 4:
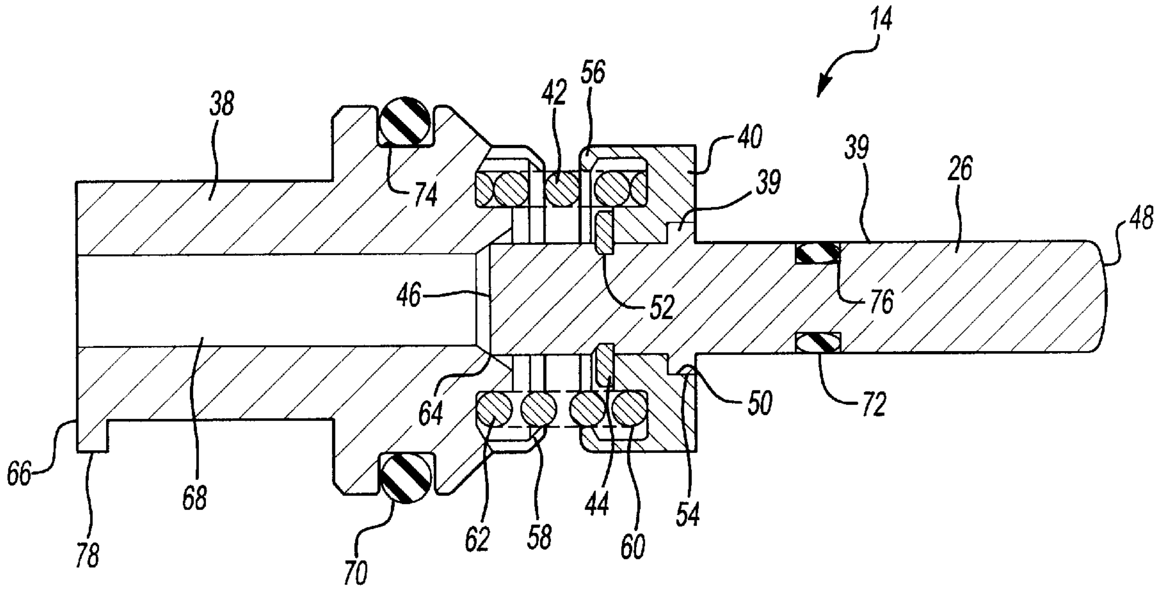
FIG. 4 illustrates a cross sectional side view of the removable valve assembly of the present invention in the closed position.

The valve assembly 14 of the present invention is illustrated in FIGS. 3 and 4. The valve assembly 14 includes a valve seat 38 and a valve portion 39 connected by a spring 42. The valve portion 39 includes a valve sleeve 40 and the valve pin 26. The valve pin 26 includes a seat end 46, a trigger end 48, an annular tab 50 and an annular groove 52. The seat end 46 of the valve pin 26 is received within the spring 42.

The valve pin 26 is secured to the valve sleeve 40 by an annular retainer clip 44. The tab 50 of the valve pin 26 engages an annular shoulder 54 of the valve sleeve 40, preventing further movement of the valve pin 26 into the valve sleeve 40. The retainer clip 44 is then added, the retainer clip 44 engages the groove 52 on the valve pin 26, securing the valve pin 26 to the valve sleeve 40. The retainer clip 44 prevents the accidental disengagement of the valve pin 26 from the valve sleeve 40 during removal of the valve assembly 14 from the body 30 of the high pressure fluid gun 10. Although it is preferred that the valve pin 26 be secured to the valve sleeve 40 by a retainer clip 44, the valve pin 26 and the valve sleeve 40 could also be integrated into one component.

The valve seat 38 and the valve sleeve 40 further include a sleeve lip 56 and a seat lip 58, respectively. The sleeve lip 56 and the seat lip 58 are crimped around opposing ends 60, 62 of the spring 42 to connect the valve seat 38 and the valve sleeve 40 to form the valve assembly 14.

The valve seat 38 further includes an angled seat 64, a tab end 66, and an internal bore 68 which extends through the valve seat 38 from the angled seat 64 to the tab end 66. In the preferred embodiment, the angled seat 64 of the valve seat 38 is angled at 65° and the seat end 46 of the valve pin 26 is angled at 60°. When the valve pin 26 is actuated, the seat end 46 of the valve pin 26 sealingly engages the angled seat 64 of the valve seat 38 to provide line contact between the valve pin 26 and the valve seat 38. In another embodiment, the angled seat 64 of the valve seat 38 and the seat end 46 of the valve pin 26 are substantially the same angle. However, more force is required to seal the seal assembly 14 in this embodiment.

The valve assembly 14 further includes an annual seat seal 70 and an annular pin seal 72. The seat seal 70 is positioned in an annual groove 74 in the valve seat 38 and substantially contacts the counter bore 36 of the body 30. The pin seal 72 is positioned in an annular groove 76 in the valve pin 26 and substantially contacts the bore 34 of the body 30. The seat seal 70 and the pin seal 72 prevent fluid from leaking from the valve assembly 14. The seals 70, 72 further prevent debris from entering the valve assembly 14.

The tab end 66 of the valve seat 38 further includes a tab 78. As illustrated in FIG. 2, an annular retaining nut 80 including a groove 82 and a plurality of external threads 84 is secured to the valve seat 38 by engaging the tab 78 into the groove 82 and rotating the valve seat 38. When installing the valve assembly 14, the retaining nut 80 holding the valve seat 38 is positioned into the opening 32 of the body 30. The retaining nut 80 is rotated to engage the plurality of external threads 84 into the surface 86 of the opening 32, securing the retaining nut 80. The threads 84 engage the surface 86 by rotating a knob 88 on the retainer nut 80.

The valve assembly 14 is installed in the body 30 of the gun 10 perpendicular to the dump tube 16. When the valve assembly 14 is installed, the seat end 46 of the valve pin 26 does not engage the angled seat 64 of the valve seat 38, as illustrated in FIG. 3. The valve pin 26 is housed within and guided by the bore 34, and the retaining nut 80 is threadedly received within the opening 32. The opening 32 is shaped and sized to receive the valve assembly 14 and the attached retaining nut 80.

High pressure fluid enters the input tube 12 and flows through the internal bore 68 of the valve seat 38 and out through the dump tube 16. When the trigger mechanism 20 is engaged by pulling the lever 22 towards the handle 24, the trigger mechanism 20 engages the trigger end 48 of the valve pin 26, pushing the seat end 46 of the valve pin 26 towards the valve seat 38, compressing the spring 42 until the seat end 46 of the valve pin 24 sealingly engages the angled seat 64 of the valve seat 38, as illustrated in FIG. 4. This blocks the flow of the high pressure fluid from entering the dump tube 16 and instead directs the high pressure fluid through the high pressure outlet 18.

When the valve assembly 14 is to be removed from the body 30, the knob 88 of the retainer nut 80 is rotated to disengage the threads 84 of the retaining nut 80 from the surface 86 of the opening 32, allowing for the removal of the valve assembly 14 and retainer nut 80 from the body 30. The valve assembly 14 can then be removed from the retainer nut 80 by rotating the valve assembly 14 to disengage the tab 78 from the groove 82.

The valve assembly 14 can be easily removed from the fluid gun 10 for maintenance purposes. Upon removal, the spring 42 holds the valve seat 38 and the valve pin 26 together, allowing the valve assembly 14 to be removed as one piece.

This invention is useful on low pressure spray guns up to very high pressures such as on the order of 40,000 psi or even higher.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. A high pressure fluid apparatus comprising:

a body portion including a high pressure fluid inlet, a high pressure fluid outlet, a low pressure fluid outlet, an opening, and a bore;

a trigger mechanism; and a valve assembly removably positioned in said opening and said bore of said body portion to control the flow of fluid through said body portion, said valve assembly including a valve seat having an annular seating portion and an internal bore, a valve member including a valve pin having a seat end, and a spring member attaching said valve seat to said valve member to allow said valve member to slide relative to said valve seat between an engagement position and a disengagement position, said valve member being slidable from said disengagement position to said engagement position when said trigger mechanism is actuated, the flow of fluid being directed through said internal bore and through said low pressure fluid outlet when said valve member is in said disengagement position, and said seat end of said valve pin sealingly engaging said seating portion of said valve seat in said engagement position to direct the flow of fluid through said high pressure fluid outlet, said valve pin being guided by said bore.

2. The high pressure fluid apparatus as recited in claim 1 wherein a valve sleeve is attached to said valve pin and said spring member is attached to said valve sleeve.

3. The high pressure fluid apparatus as recited in claim 2 wherein said valve sleeve and said valve seat are crimped around opposing ends of said spring member to attach said valve pin to said valve sleeve.

4. The high pressure fluid apparatus as recited in claim 1 wherein said valve seat further includes an internal bore which allows the flow of fluid therethrough.

5. The high pressure fluid apparatus as recited in claim 1 wherein said valve seat further includes a protrusion to secure said valve assembly to a gun.

6. The high pressure fluid apparatus as recited in claim 5 wherein said valve seat is positioned within a retainer, said protrusion engaging a groove on said retainer to secure said valve seat to said retainer.

7. The high pressure fluid apparatus as recited in claim 6 wherein said valve seat positioned within said retainer is threadedly secured to said opening of said body portion.

8. The high pressure fluid apparatus as recited in claim 1 wherein a pin seal engages a pin groove located on said valve pin and a seat seal engages a seat groove located on said valve seat.

9. The high pressure fluid apparatus as recited in claim 1 wherein said seat end of said valve pin sealingly engages said seating portion of said valve seat to substantially provide line contact therebetween.

10. The high pressure fluid apparatus as recited in claim 9 wherein said seat end of said valve pin is angled at 60° and said seating portion of said valve seat is angled at 65°.

11. The high pressure fluid apparatus as recited in claim 1 wherein a spring actuated member biases said trigger to a non-actuated position.

12. The high pressure fluid apparatus as recited in claim 1 wherein said trigger mechanism engages a trigger end of said valve pin.

* * * * *